Dec. 4, 1945. W. J. JOHNSON 2,390,103
UNION TUBE CONNECTION LOCKING NUT
Filed March 8, 1943
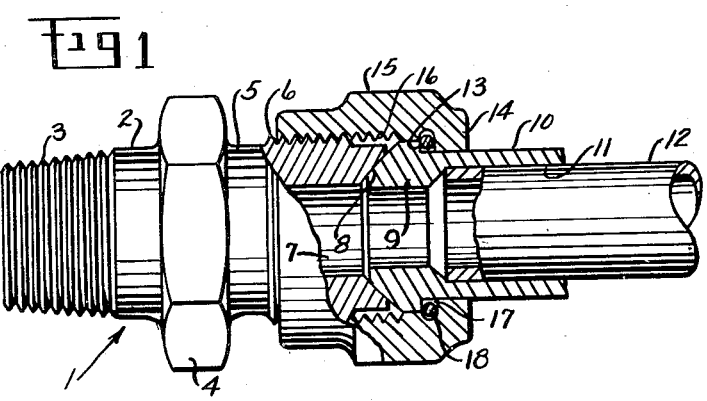
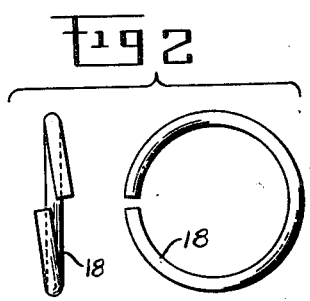
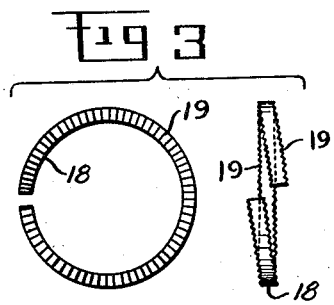
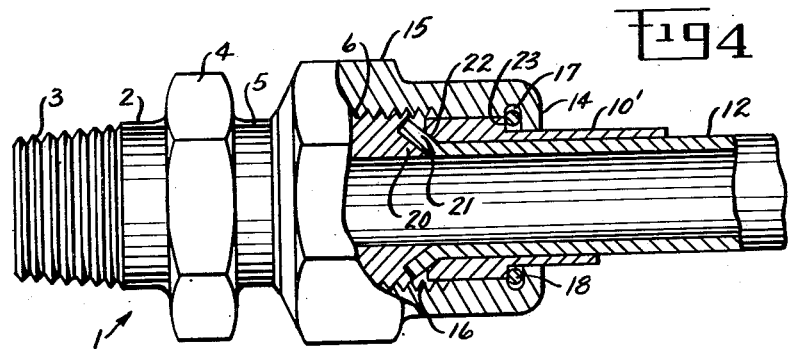
INVENTOR
WILLIAM J. JOHNSON Patented Dec. 4, 1945

2,390,103

UNITED STATES PATENT OFFICE 2,390,103

UNION TUBE CONNECTION LOCKING NUT

William J. Johnson, Dayton, Ohio

Application March 8, 1943, Serial No. 478,458

3 Claims. (Cl. 285—122)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a very simple yet novel means to safety union tube connections particularly where used on aircraft.

Union tube connections as employed on aircraft are subject to vibration so that the union nut may be loosened and allow leakage at the connection, and consequently there is a tendency for mechanics to tighten such connections excessively and thereby cause damage to the fitting. In accordance with the present invention the union nut is provided with an internal annular groove into which a conventional split spring lock washer is inserted prior to assembly of the union nut on the tube to be connected. Upon assembly the lock washer, which may be serrated, engages the flange on the cone sleeve and the nut, to prevent rotation of the union nut when the same is drawn up on the adapter or threaded connection to which the tube is to be connected.

The detailed construction of the invention will become apparent by reference to the description hereinafter given and to the appended drawing in which:

Fig. 1 is a sectional side elevation view illustrating the invention as applied to the soldered union tube type of connection;

Figs. 2 and 3 are views illustrating lock washers suitable for use in the device of Fig. 1;

Fig. 4 is a sectional view similar to Fig. 1 showing the application of the invention to the flared tube or solderless type of union tube connection.

Referring to Fig. 1, the reference numeral 1 generally indicates a conventional threaded adapter to which a tube is to be connected, the adapter having a portion 2 pipe threaded as at 3 to be screwed into a tank boss or other suitable opening, a central hexagonal portion 4 for application of a wrench, and a body portion 5 having straight threads 6 onto which the union coupling is screwed.

The adapter is provided with a central bore 7 terminating at its outer end in an outwardly flared conical seat 8 which is adapted to sealingly engage an annular cone 9 formed on the end of a sleeve 10, the latter being counterbored as at 11 to slip over the end of the tube 12 which is to be connected to the adapter 1. The sleeve 10 is soldered to the tube 12 to form a permanent assembly therewith. The outer diameter of the cone 9 is greater than the outside diameter of the sleeve 10 so that the rear face of the cone forms a shoulder 13, which in conventional construction is engaged by an inwardly directed annular flange portion 14 of a union nut 15 which is internally threaded as at 16 to screw onto the adapter 1.

The structure so far described is entirely conventional and as heretofore employed in the art, the union nut 15 is drawn up on the adapter 1 until the flange 14 of the nut engages the flange 13 of the cone 9 and causes the cone to tightly engage the seat 8 of the adapter or other element to which the tube 12 is to be connected. While friction between the abutting faces of the flanges 13 and 14 can be made quite high by tightening the union nut 15, the frictional force would cease as soon as the abutting flange faces slightly separated due to loosening of the union nut 15, due to vibration, and to prevent rotation of the union nut excessive tightening of the same is necessary or some type of safety means must be employed.

The present invention consists of forming an internal annular groove 17 in the union nut 15 adjacent the front face of the flange 14 thereof, the depth of the groove being sufficient to accommodate the expanded radial dimensions of a conventional split spring type lock washer 18 which has an inside diameter sufficient to slip over the sleeve 10. The width of the groove 17 should be slightly in excess of the fully compressed width of the lock washer.

Fig. 2 illustrates a conventional round wire type of split spring lock washer 18, and Fig. 3, illustrates a conventional lock washer in which serrations 19 are formed on the opposite end faces thereof to enhance the gripping action.

In use the union nut 15 and lock washer 18 are slipped onto the sleeve 10 with the lock washer in register with the groove 17, the tube 12 then being soldered into the sleeve 10. When the union nut 15 is screwed onto the adapter 1, the lock washer 18 is compressed between the flanges 13 and 14, and due to its spring effect creates a high frictional resistance to backward rotation of the union nut without requiring any excessive tightening of the nut, and eliminating cumbersome external safety means. When serrated lock washers such as illustrated in Fig. 3 are employed, the frictional resistance to loosening of the union nut is enhanced.

Fig. 4 illustrates the application of the invention to the conventional solderless or flared tube type of union tube connection, which differs only in that the adapter 1 is provided with a male conical projection 20 which is adapted to seat in the flared end 21 of the tube 12. The tubular sleeve 10' has a conical seat 22 therein into which the flared end of the tube 12 is fitted, the sleeve having a shoulder 23 corresponding to the shoulder 13 of the device of Fig. 1. The internal annular groove 17 is cut in the union nut 15 in the same manner as in the device of Fig. 1, and the lock washer cooperates with the flange 14 and shoulder 23 in the same manner as in the device of Fig. 1.

Though I have illustrated the preferred use of my invention, various changes and variations therein will become apparent to those skilled in the art as falling within the scope of the invention as defined in the appended claims.

I claim:

1. In a union coupling connection for a tubular conduit, said coupling connection including an internally threaded union nut having an inwardly directed annular flange at one end thereof, and an element associated with the conduit for transmitting connection forces thereto, said element having a radially extending portion thereof of greater diameter than the inside diameter of said inwardly directed flange; the improvement which consists of positioning a circular split compressible spring lock washer between the inwardly directed flange on said union nut and the radially extending portion of said element, whereby when said lock washer is axially compressed in abutting engagement with the inwardly directed flange of the union nut said lock washer will cause high frictional resistance to rotation of said union nut relative to said element.

2. The structure as claimed in claim 1, in which said union nut is provided with an internal annular groove having a radial depth sufficient to accommodate the maximum diameter of said lock washer when the latter is compressed and said groove having a width slightly in excess of the axial dimensions of said lock washer when compressed, said annular groove being positioned adjacent the inwardly directed flange on said union nut.

3. In a union coupling for tubular conduits of the character in which a tubular sleeve having a radially extending shoulder is secured to the end of the tube to be connected for transmitting clamping stress from the sleeve to the tube and an internally threaded union nut having an annular inwardly directed flange having an inside diameter less than the outside diameter of the shoulder on said sleeve, the flange on said union nut being located at the inner end thereof and said nut being axially slidable relative to said sleeve and tube until said flange engages said shoulder; the combination with said tubular sleeve and union nut of an axially compressible split lock washer positioned between said inwardly directed flange and said shoulder and adapted to be compressed therebetween, and an internal groove in said union nut having a depth and width to allow for radial expansion of the lock washer therein and axial compression of said washer respectively.

WILLIAM J. JOHNSON.